(12) United States Patent
Bednarik et al.

(10) Patent No.: US 7,507,473 B2
(45) Date of Patent: *Mar. 24, 2009

(54) ENHANCED ADHESION OF POLYETHYLENE TEREPHTHALATE TO PAPERBOARD

(75) Inventors: Ladislav Bednarik, Loveland, OH (US); Vivek Rohatgi, Owasso, OK (US); David V Reed, Blanchester, OH (US)

(73) Assignee: International Paper Company, Loveland, OH (US)

(*) Notice: Subject to any disclaimer, the term of this patent is extended or adjusted under 35 U.S.C. 154(b) by 0 days.

This patent is subject to a terminal disclaimer.

(21) Appl. No.: 11/893,384

(22) Filed: Aug. 15, 2007

(65) Prior Publication Data

US 2008/0145653 A1  Jun. 19, 2008

Related U.S. Application Data

(63) Continuation of application No. 10/722,951, filed on Nov. 26, 2003, now Pat. No. 7,270,876.

(60) Provisional application No. 60/429,322, filed on Nov. 27, 2002.

(51) Int. Cl.
*B32B 27/10* (2006.01)
*B32B 27/16* (2006.01)
*B32B 27/30* (2006.01)
*B32B 27/36* (2006.01)
*B32B 37/15* (2006.01)

(52) U.S. Cl. .............. 428/342; 428/341; 428/219; 428/340; 428/480; 428/481; 428/483; 428/507; 428/511; 428/512; 428/513; 428/514; 428/537.5; 428/537.7; 427/223; 427/299; 427/322; 427/324; 427/326; 427/402; 427/407.1; 427/411

(58) Field of Classification Search .................. None
See application file for complete search history.

(56) References Cited

U.S. PATENT DOCUMENTS

| | | |
|---|---|---|
| 3,904,104 A | 9/1975 | Kane |
| 3,924,013 A | 12/1975 | Kane |
| 3,967,998 A | 7/1976 | Kane |
| 4,044,197 A | 8/1977 | Wiest et al. |
| 4,147,836 A | 4/1979 | Middleton et al. |
| 4,455,184 A | 6/1984 | Thompson |
| 4,543,280 A | 9/1985 | Fujita et al. |
| 4,737,548 A | 4/1988 | Kojima et al. |
| 4,745,019 A | 5/1988 | Posey et al. |
| 4,872,951 A * | 10/1989 | Maliczyszyn et al. ........ 162/135 |
| 5,022,554 A | 6/1991 | Heeter et al. |
| 5,178,960 A | 1/1993 | Cook |
| 5,360,663 A | 11/1994 | Moteki et al. |
| 5,418,008 A | 5/1995 | Calvert |
| 5,855,973 A | 1/1999 | Calvert et al. |
| 5,935,664 A | 8/1999 | Claytor et al. |
| 5,942,295 A | 8/1999 | Adur et al. |
| 5,968,647 A | 10/1999 | Adur et al. |
| 5,981,011 A | 11/1999 | Overcash et al. |
| 6,030,477 A | 2/2000 | Olvey |
| 6,068,897 A | 5/2000 | Adur et al. |
| 6,074,733 A | 6/2000 | Falat |
| 6,132,886 A | 10/2000 | Share |
| 6,193,831 B1 | 2/2001 | Overcash et al. |
| 6,358,576 B1 | 3/2002 | Adur et al. |
| 6,540,862 B1 | 4/2003 | Calvert et al. |
| 6,544,722 B2 | 4/2003 | Bouwstra et al. |
| 6,645,584 B1 | 11/2003 | Kuusipalo et al. |
| 6,762,239 B1 | 7/2004 | Williams |
| 6,787,205 B1 | 9/2004 | Aho et al. |
| 6,903,161 B2 | 6/2005 | Morris |
| 7,270,876 B2 * | 9/2007 | Bednarik et al. ............ 428/341 |
| 2001/0024730 A1 | 9/2001 | Broce et al. |
| 2001/0046574 A1* | 11/2001 | Curtis ..................... 428/34.2 |
| 2008/0145654 A1* | 6/2008 | Bednarik et al. ............ 428/342 |

FOREIGN PATENT DOCUMENTS

| | | | |
|---|---|---|---|
| EP | 0421103 | | 8/1990 |
| GB | 2057337 | | 4/1981 |
| JP | 56-008408 | * | 1/1981 |
| JP | 10-151655 | | 9/1998 |
| JP | 1 788 057 | * | 5/2007 |
| WO | WO 98/41588 | | 9/1998 |

* cited by examiner

*Primary Examiner*—Vivian Chen
(74) *Attorney, Agent, or Firm*—Thomas W. Ryan, III

(57) ABSTRACT

A unique primer emulsion chemistry yields excellent adhesion of polyethylene terephthalate (PET)resin to clay coated paperboard (with high starch content) at reduced coatweights of the primer emulsion and the resin as compared to other primer and tie-resin chemistries currently employed for moisture barrier applications. A primer used for adhesion enhancement is an ammonium catalyzed, self-crosslinking copolymer of ethylene-vinyl acetate with N-methylol acryl amide functional groups attached to a polymer backbone. Use of the primer in amounts up to about 0.5 pounds per ream permits PET coatweights of as low as 10-12 lbs per ream and lower for some applications.

21 Claims, No Drawings

ENHANCED ADHESION OF POLYETHYLENE TEREPHTHALATE TO PAPERBOARD

This application is a continuation of application Ser. No. 10/722,951, filed Nov. 26, 2003, U.S. Pat. No. 7,270,876, which claims the benefit of U. S. Provisional Patent Application No. 60/429,322, filed Nov. 27, 2002, the disclosure of which is hereby incorporated herein by reference.

BACKGROUND OF THE INVENTION

This invention is directed to providing enhanced adhesion of polyethylene terephthalate (PET) resin to paperboard substrates to facilitate use of lower coatweights of the resin for providing a moisture barrier.

Currently, extrusion coatweights of 28 to 32 pounds per ream of polyethylene terephthalate resin are applied to bleached board grades for dual ovenable tray applications such as in connection with frozen food containers. In addition to higher manufacturing costs, heavy coatweights result in issues with die cutting and product formability. There is therefore a need to develop processes and/or materials to be able to lower the coatweight of extruded polyethylene terephthalate film while retaining its high adhesion to paperboard to fit the end-use performance requirements.

It is an advantage of this invention to provide a primer allowing lower polyester coatweights on paperboard.

It is another advantage of the invention to provide PET coated paperboard having improved die cutting and formability characteristics.

It is still another advantage of the invention to provide a primer for improved adhesion enhancement of PET to the felt side of clay coated paperboard.

These other advantages of the invention will be apparent to one of ordinary skill in the art after reading the following description of the invention.

SUMMARY OF THE INVENTION

The present invention relates to a primer emulsion chemistry yielding excellent adhesion of polyethylene terephthalate resin to clay coated paperboard (with relatively high starch content) at much reduced coatweights of the resin. The primer used for adhesion enhancement is an ammonium chloride catalyzed, self-crosslinking copolymer of ethylene-vinyl acetate with N-methylol acryl amide functional groups attached to a polymer backbone. The use of the primer facilitates use of PET coatweights of as low as about 10-12 pounds per ream (and lower for some applications).

DETAILED DESCRIPTION OF THE INVENTION

The invention enables the use of lower coatweights for adhesion to dual ovenable trays and the like and thereby lowers costs for a product that converts easily on existing equipment.

The invention makes use of a primer emulsion for adhering coatweights of polyethylene terephthalate as low as about 12 pounds per ream to clay coated board with high starch, (basis weight of 199 lbs/ream) and coatweights of as low as about 10 pounds per ream of polyethylene terephthalate for non-clay-coated board with a basis weight of 282 lbs/ream. The adhesive primer has a dry weight of up to about 0.5 pounds per ream.

The end product exhibited adhesion measured with 180° peel strength over 600 grams per inch (g/in) under TAPPI conditions and over 800 g/in at high temperature and humidity. This was an unexpected result when using an adhesive primer in such low quantities, especially for clay coated board with a starch content ranging from 25-40 pounds per ton which interferes with polyethylene terephthalate adhesion to the board substrate.

This discovery enables a blister free product when an empty converted tray is subjected to high temperatures at 400° F. - 420° F. for up to half an hour and for a food filled tray for up to one hour in a convection oven or on high power for five minutes in a microwave oven.

Extrudable coated paperboard for dual ovenable tray applications can be produced with a low coatweight extruded polyester coating. The extrusion is conducted using an Er-WE-Pa extrusion line at a speed ranging, for example, between about 800 and 1200 feet per minute over primed paperboard with and without the use of a flame treater.

A preferred primer used for adhesion enhancement is an ammonium chloride catalyzed, self-crosslinking copolymer of ethylene-vinyl acetate with N-methylol acryl amide functional groups attached to a polymer backbone. The primer is applied in line with extrusion at coatweights of as low as 0.1-0.5 pounds per ream. Functional structures with polyethylene terephthalate resin coatweights ranging from 12 to 18 lbs/ream can be obtained. Polyethylene terephthalate with coatweights lower than 10 lbs/ream can be used to adhere to paper with priming. In certain applications, these coatweights may be too low, but they can be obtained with the unique primer formulation for applications such as non clay coated board. Misting and flame treatment optionally can be used with the primer. Optionally, misting with water is applied to the board prior to primer application in line with the extrusion process at the rate of 0.01 to 0.1 lbs/ream without sacrificing adhesion. The primer preferably is applied by gravure cylinder followed up by hot air drying.

A variation of the invention comprises using a polyethylene terephthalate coextrusion with epoxy modified polyolefin tie resins. Other variations and modifications will be obvious to one of ordinary skill in the art without departing from the scope of the invention. The invention encompasses such variations and modifications.

The invention claimed is:

1. A package material comprising
   a paperboard substrate;
   at least one primer, wherein the at least one primer comprises at least one ammonium catalyzed, self-cross linking copolymer of ethylene-vinyl acetate with N-methylol acryl amide functional groups attached to a polymer backbone; and
   at least one polyester coating;
   wherein the at least one primer comprises from 0.1 to 0.5 lbs/ream.

2. The package material according to claim 1, comprising at least 10 lbs/ream of the at least one polyester coating; and wherein the paperboard substrate is not clay coated.

3. The package material according to claim 1, comprising at least 12 lbs/ream of the at least one polyester coating.

4. The packaging material according to claim 3, wherein said paperboard substrate is clay coated.

5. The packaging material according to claim 1, wherein said paperboard substrate is clay coated.

6. The packaging material according to claim 5, further comprising from 25 to 40 lbs/ton of starch.

7. The packaging material according to claim 1, wherein the at least one polyester coating comprises polyethylene terephthalate.

8. The packaging material according to claim 1, wherein said packaging material has a 180° peel strength of greater than 600 g/in under TAPPI conditions.

9. A method of making the packaging material according to claim 1, comprising
applying the at least one primer to the paperboard substrate to form a primed substrate, and
applying the at least one polyester coating to the primed substrate.

10. The method according to claim 9, comprising applying the at least one primer to the paperboard substrate to form a primed substrate having from 0.1 to 0.5 lbs/ream of the at least one primer.

11. The method according to claim 9, comprising applying the at least one polyester coating to the primed substrate so that the packaging material has at least 10 lbs/ream of at least one polyester coating.

12. The method according to claim 9, comprising applying the at least one polyester coating to the primed substrate so that the packaging material has at least 12 lbs/ream of the at least one polyester coating.

13. The method according to claim 9, wherein the at least one polyester coating is extruded onto the primed substrate.

14. The method according to claim 13, wherein the at least one polyester coating is extruded onto the primed substrate at a line speed of from 800 to 1200 feet per minute 15. The method according to claim 9, wherein the at least one polyester coating comprises polyethylene terephthalate.

16. The method according to claim 9, further comprising flame treating the substrate.

17. The method according to claim 9, further comprising water misting the substrate.

18. The method according to claim 17, wherein water is misted at an amount ranging from 0.01 to 0.1 lbs/ream.

19. The method according to claim 9, further comprising clay coating the substrate.

20. A method of increasing the 180° peel strength of a package material, comprising applying at least one primer to the paperboard substrate to form a primed substrate having from 0.1 to 0.5 lbs/ream of the at least one primer, wherein the at least one primer comprises at least one ammonium catalyzed, self-cross linking copolymer of ethylene-vinyl acetate with N-methylol acryl amide functional groups attached to a polymer backbone; and applying at least one polyester coating to the primed substrate so that the packaging material has at least 12 lbs/ream of at least one polyester coating.

21. A method of increasing the 180° peel strength of a package material, comprising applying at least one primer to the paperboard substrate to form a primed substrate having from 0.1 to 0.5 lbs/ream of the at least one primer, wherein the at least one primer comprises at least one ammonium catalyzed, self-cross linking copolymer of ethylene-vinyl acetate with N-methylol acryl amide functional groups attached to a polymer backbone; and applying at least one polyester coating to the primed substrate so that the packaging material has at lest 10 lbs/ream of at least one polyester coating, wherein the paperboard substrate is not clay coated.

* * * * *